United States Patent
Calvet

[19]

[11] Patent Number: 6,146,044
[45] Date of Patent: Nov. 14, 2000

[54] ROTARY FLEXURE

[75] Inventor: Robert John Calvet, Pasadena, Calif.

[73] Assignee: California Institute of Technology, Pasadena, Calif.

[21] Appl. No.: 09/144,534

[22] Filed: Aug. 31, 1998

Related U.S. Application Data

[60] Provisional application No. 60/056,049, Sep. 2, 1997.

[51] Int. Cl.[7] ................................ F16C 11/00
[52] U.S. Cl. ..................... 403/119; 403/112; 403/113; 403/117; 403/291; 403/108; 267/154; 267/160
[58] Field of Search ................ 403/119, 83, 85, 403/106, 108, 111, 112, 113, 348, 349, 117, 164, 57, 52, 53, 74, 291; 267/154, 160, 273, 279, 284

[56] References Cited

U.S. PATENT DOCUMENTS

| | | | |
|---|---|---|---|
| 875,251 | 12/1907 | Field | 403/117 |
| 2,735,731 | 2/1956 | Freebairn, Jr. et al. | 267/160 X |
| 2,907,563 | 10/1959 | Verde et al. | 267/160 |
| 2,931,092 | 4/1960 | Humphrey | 403/291 X |
| 3,073,584 | 1/1963 | Troeger | 267/160 |
| 3,124,873 | 3/1964 | Troeger | 403/291 X |
| 3,181,918 | 5/1965 | Troeger | 267/160 X |
| 3,252,696 | 5/1966 | Friedel | 403/291 X |
| 3,277,555 | 10/1966 | Kutash | 267/160 X |
| 3,319,951 | 5/1967 | Seelig | 267/160 |
| 3,360,255 | 12/1967 | Ormond | 267/154 |
| 3,386,780 | 6/1968 | Durgin | 403/291 |
| 3,807,029 | 4/1974 | Troeger | 267/160 X |
| 3,811,665 | 5/1974 | Seelig | 267/160 |
| 3,813,089 | 5/1974 | Troeger | 267/160 |
| 3,825,992 | 7/1974 | Troeger | 267/160 X |
| 3,909,077 | 9/1975 | Leonarduzzi | 403/291 |
| 4,405,184 | 9/1983 | Bahiman | 403/291 |
| 4,637,596 | 1/1987 | Lewis | 267/160 |
| 4,655,629 | 4/1987 | Flaherty | 403/291 |
| 4,802,784 | 2/1989 | Brooks | 403/24 |
| 4,812,072 | 3/1989 | Brooks | 403/291 X |
| 5,150,827 | 9/1992 | Fries | 267/160 X |
| 5,209,461 | 5/1993 | Whightsil, Sr. | 267/154 X |
| 5,529,277 | 6/1996 | Ostaszewski | 267/160 X |
| 5,620,169 | 4/1997 | Payne | 267/160 |

*Primary Examiner*—Lynne H. Browne
*Assistant Examiner*—Danielle Somrak
*Attorney, Agent, or Firm*—Fish & Richardson PC

[57] ABSTRACT

A rotary flexure is designed to exhibit very high radial and axial stiffness and to exhibit virtually no movement in its center of rotation. The flexure, which is formed from a single billet of material, includes an outer ring from which three thin flexure blades extend. The flexure blades extend toward the centerpoint of the rotary flexure, where they join to form a centerpiece. Three lobes also join at the centerpiece, one between each pair of flexure blades. The lobes extend toward the outer ring, and are free to rotate about the pivot axis with respect to the outer ring and the flexure blades. During rotation, the pivot axis exhibits virtually no movement.

7 Claims, 5 Drawing Sheets

ROTARY FLEXURE

CROSS REFERENCE TO RELATED APPLICATIONS

This application claims the benefit of the U.S. Provisional Application No. 60/056,049, filed on Sep. 2, 1997, which is incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND OF THE INVENTION

Flexure pivots are rotary motion control devices used in electro-mechanical applications to control relatively high precision rotary motion over small distances. For example, flexure pivots are used to enable the positioning of camera heads to a high degree of precision. The flexure pivot has no dead band, friction, or hysteresis which would impede precise positioning.

One problem with commercial flexure pivots is that they tend to introduce lateral motion at their centers of rotation as they rotate. This motion degrades the performance of devices mounted to the pivots. Commercial pivots also often fatigue rather quickly and often buckle under heavier loads.

FIG. 1 shows a commonly used flexure pivot, known commercially as a Bendix flexure 10. The Bendix flexure consists of a cylindrical tube 12 that houses a pivoting element 14 connected to the tube 12 by two, perpendicular flexure blades 16, 18. The pivoting element 14 and the flexure blades 16, 18 are formed from separate materials and then affixed to each other and to the cylindrical tube 12. The flexure blades 16, 18 allow the pivoting element 14 to move within the cylindrical tube 12, as shown by the arrows 28, 30, when force is applied to the pivoting element. The flexure elements 16, 18 also operate in conjunction with two raised surfaces 20, 22 in the cylindrical tube 12 to restrict the motion of the pivoting element 14. As the pivoting element 14 moves within the cylindrical tube 12, the element's center of rotation 24 also moves, as shown by the arrow 26.

SUMMARY OF THE INVENTION

The inventor's recognition of a need for an improved rotary flexure, e.g., one with virtually no shift in center of rotation, led to the invention.

In one aspect, the invention involves a rotary flexure having at least three lobe elements that are free to rotate about a central pivot axis. The lobe elements all join near the pivot axis at a centerpiece. Three blade elements also join at the centerpiece and extend outward toward an outer wall from which the blade elements depend. Like the lobe elements and blade elements, the outer wall is centered on the pivot axis.

In some embodiments, a notch may be formed in one end of each lobe element and a corresponding detent may protrude from the outer wall into the notch. The blade elements may be spaced evenly about the pivot axis and may have equal width. Each pair of the blade elements may have one of the lobe elements positioned between them. A single piece of material may be used to form the outer wall, the centerpiece, the blade elements, and the lobe elements.

In another aspect, the invention relates to using the rotary flexure in either of two ways: keeping the outer wall and the blade element stationary and rotating the lobe elements about the pivot access, or keeping the lobe elements stationary and rotating the outer ring and the blade elements about the pivot axis. In some embodiments, a rotating object may be affixed to the portion of the rotary flexure that is rotating about the pivot axis.

In another aspect, the invention relates to making a rotary flexure by providing a billet of conductive material, immersing the billet in a conducting bath, and, while the billet is immersed in the bath, passing an excited wire through the billet to remove material from the billet and form a plurality of flexure blades and flexure lobes in the billet. In some embodiments, an exposed surface of the billet may be machined to recess the flexure blades.

Each implementation of the invention may provide one or more of several advantages. For example, a rotary flexure embodying the invention has virtually no shift in center of rotation, i.e., a shift on the order of $10^{-6}$ m at $10°$ of rotation. The rotary flexure also has greater ratios of radial-to-torsional stiffness (approximately 3200 pound-inches) and axial-to-torsional stiffness (approximately 7400 inch-pound/radian) than existing commercial pivots. Moreover, the rotary flexure has no global buckling modes and hence can withstand greater load levels than commercial pivots, approaching the tensile limits of the material. The rotary flexure also exhibits a theoretically infinite fatigue life at large ranges of motion, i.e., $±10°$ or greater.

A rotary flexure constructed monolithically from a single billet of material provides higher reliability than existing commercial pivots and is more likely to achieve its theoretical fatigue life. The monolithically fabricated pivot also reduces the number of construction steps required.

Other embodiments and advantages will become apparent from the following description and from the claims.

DETAILED DESCRIPTION

Figure 1:
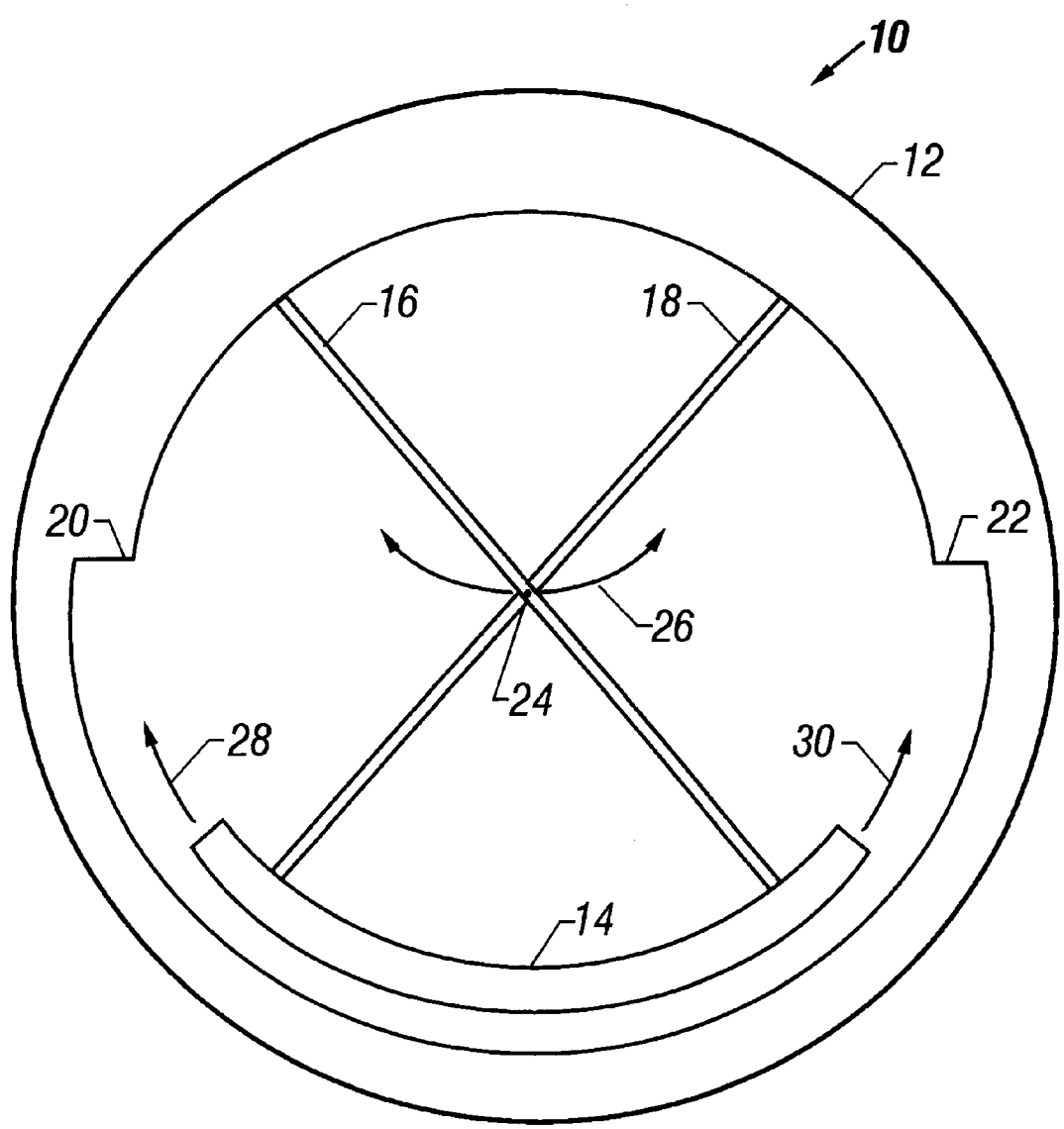
FIG. 1 is a cross-sectional view of a conventional Bendix flexure.
Figure 2:
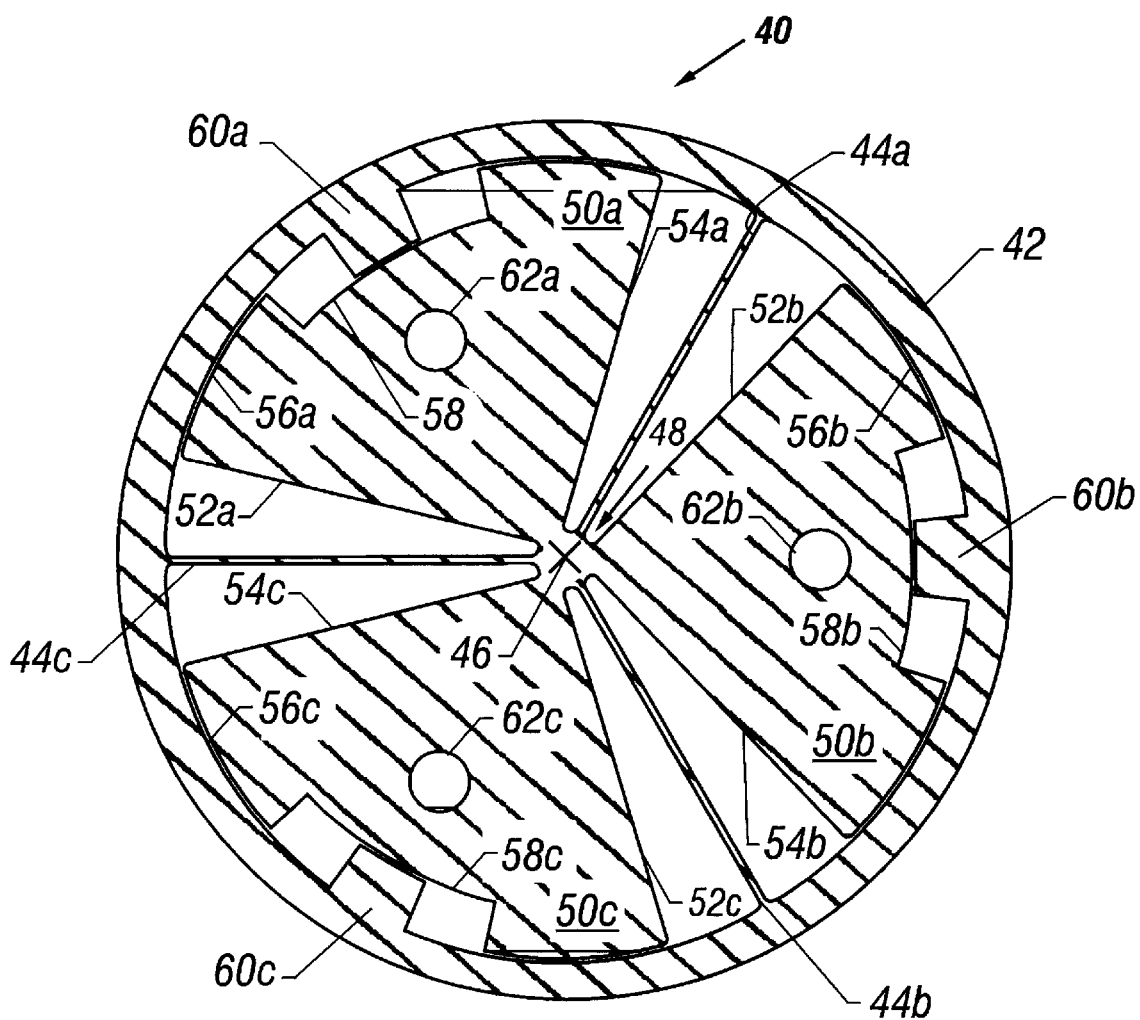
FIG. 2 is a cross-sectional view of a rotary flexure embodying the invention.

FIG. 2 shows a rotary flexure 40 having very high radial and axial stiffness, for which the center of rotation exhibits virtually no movement. The flexure 40 can be formed from a single billet of material, as described below.

The flexure 40 includes an outer ring 42 from which three thin flexure blades 44a–c extend. The flexure blades 44a–c extend toward the center point 46 of the rotary flexure, where they join to form a centerpiece 48. The flexure blades 44a–c may be evenly spaced, $120°$ apart, to maximize the performance of the rotary flexure 40. The rotary flexure 40 also includes three lobes 50a–c that join at the centerpiece 48 and extend toward the outer ring 42. Each lobe 50a–c lies between two of the flexure blades 44a–c, with the side surfaces 52a–c, 54a–c of the lobes sufficiently separated from the flexure blades 44a–c to allow a desired range of motion. The outer surface 56a–c of each of the lobes includes a respective notch 58a–c, into which a corresponding detent 60a–c on the outer ring 42 protrudes. The notches and detents together serve to limit the rotary motion of the flexure. The widths of the notches 58a–c and detents 60a–c are determined by the desired range of motion. The lobes also include mounting holes 62a–c that allow another device, such as a camera head, to mount to the flexure.

Because the rotary flexure includes at least three blades, the flexure has no global buckling modes. When one of the blades buckles under a heavy load, i.e., a load that imparts lateral motion, the other two blades continue to carry the load. Existing commercial pivots do not protect against global buckling in this manner.

One design consideration for the rotary flexure is the size of the centerpiece. In general, the stiffness ratios of the flexure improve as the size of the centerpiece decreases. The monolithic fabrication process described below allows for the formation of a very small centerpiece.

Figure 3:
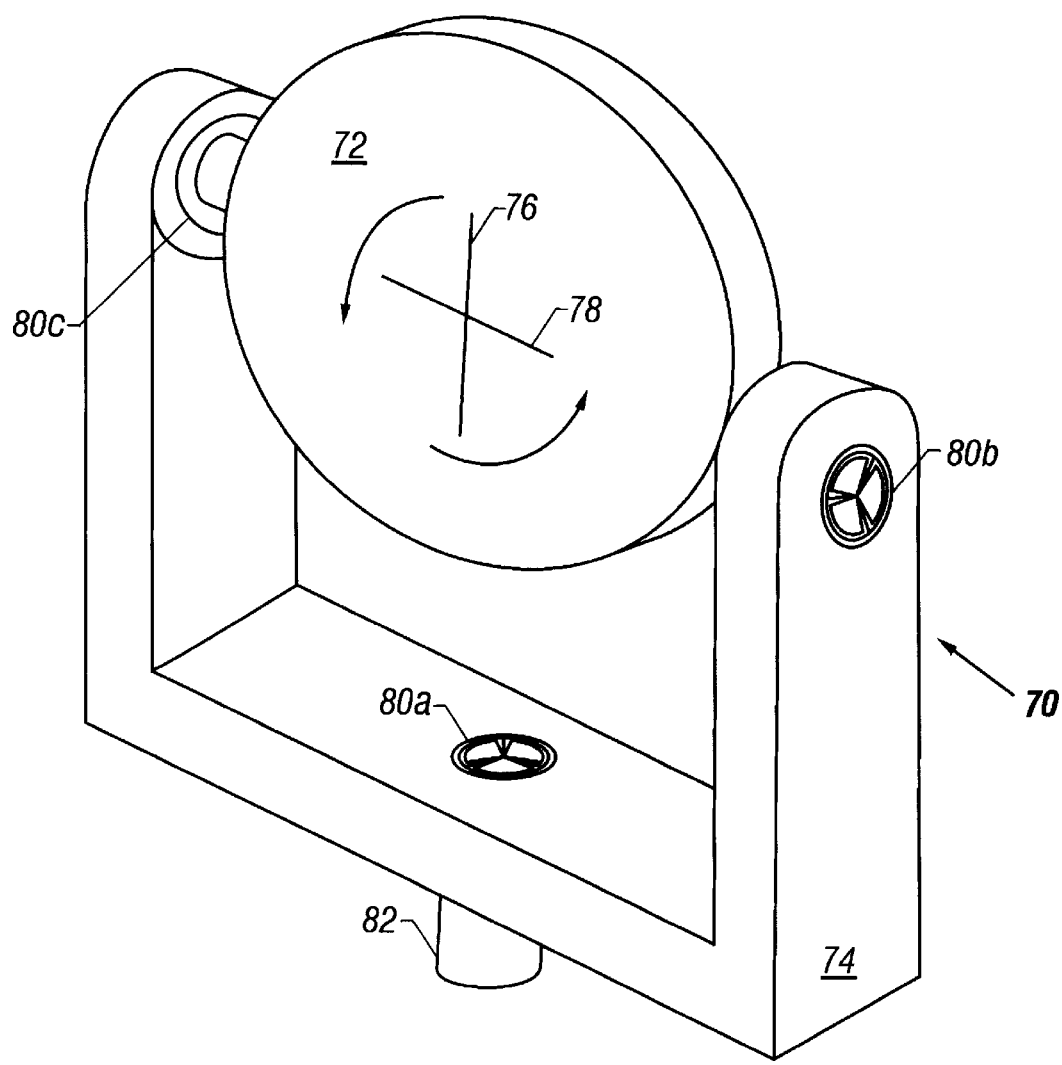
FIG. 3 is a perspective view of a dual axis gimbal containing several rotary flexures like that shown in FIG. 2.

FIG. 3 shows several rotary flexures 80a–c in use in a gimbal 70 for an articulating mirror 72. The gimbal 70 includes a U-shaped bracket 74, into which the flexures are mounted along two axes of rotation 76, 78. One of the flexures 80a limits the rotation of the gimbal about the vertical axis 76; the other two flexures 80b–c limit the rotation of the mirror 72 about the horizontal axis 78. The outer ring of the flexure 80a lying on the vertical axis 76 is fixed within the gimbal's U-bracket. The flexure's three lobes are connected to a fixed post 82 that protrudes from some other component of the system in which the gimbal resides. The rotary flexure 80a allows the gimbal 70, including the flexure's outer ring, to rotate about the vertical axies 76, while the three lobes and the post 82 remain stationary. The detents 60a–c (FIG. 2) on the outer ring and the notches 58a–c (FIG. 2) in the lobes limit the rotary motion of the gimbal, e.g., to ±10°.

The outer rings of the flexures 80b–c lying on the horizontal axis 78 are fixed to the U-shaped bracket, and the lobes of the flexures are affixed to the mirror 72. These flexures 80b–c allow the mirror 72, including the lobes, to rotate while the outer rings remain still.

Figure 4:
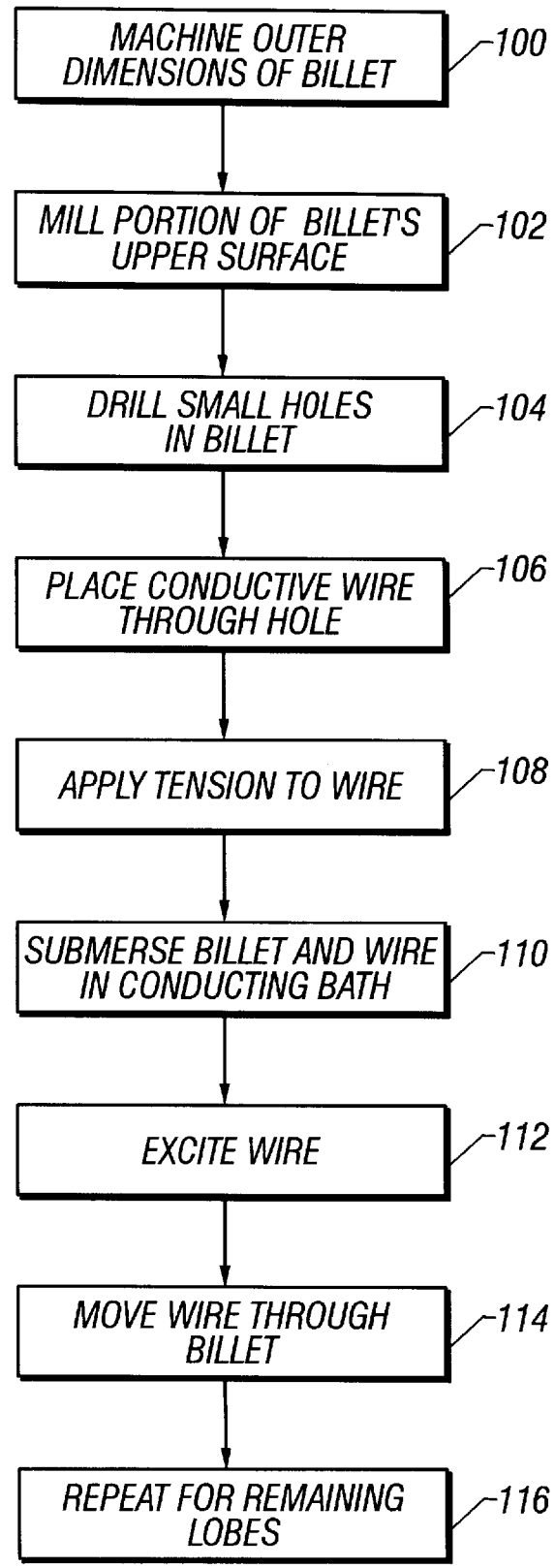
FIG. 4 is a flow chart of a monolithic fabrication process for the rotary flexure of FIG. 2.
Figure 5:
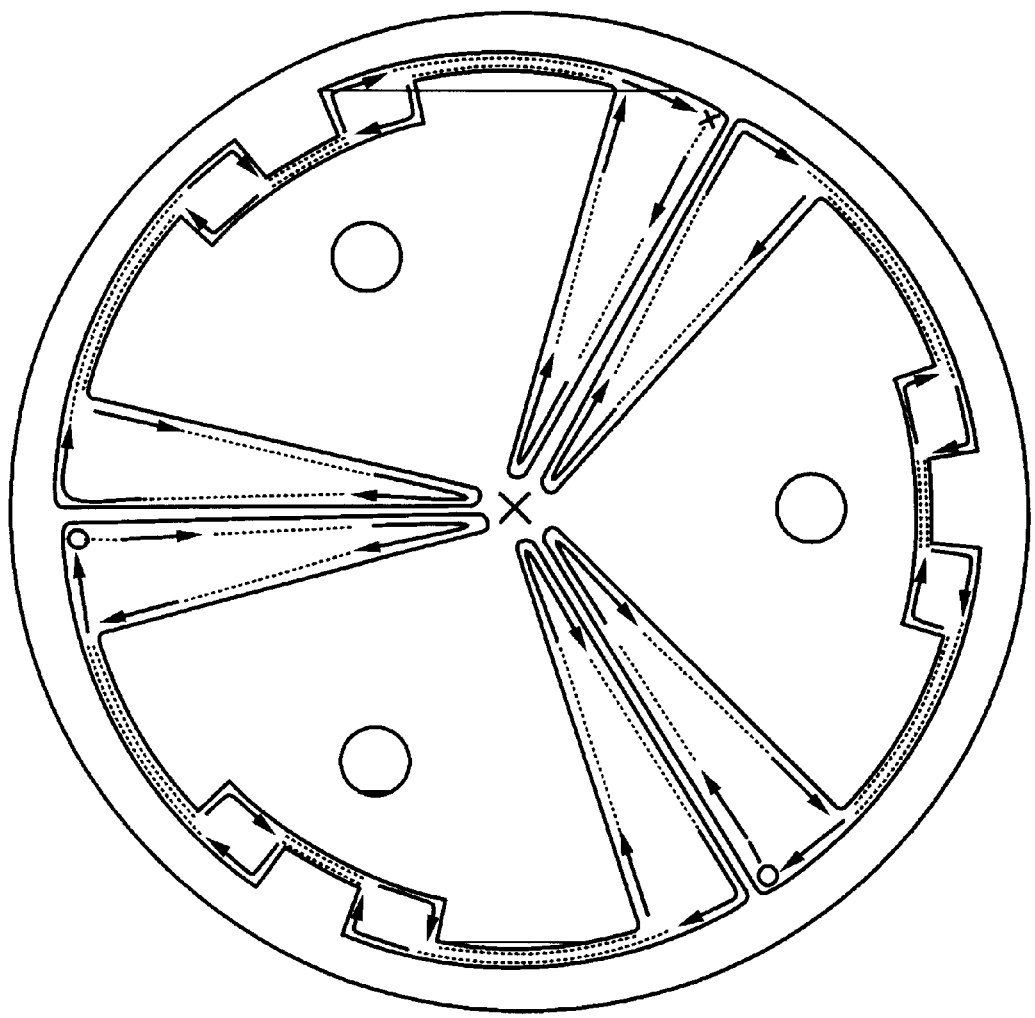
FIG. 5 is a schematic diagram of a monolithic fabrication process for the rotary flexure of FIG. 2.

FIG. 4 is a flowchart and FIG. 5 is a schematic diagram for the monolithic construction of the rotary flexure shown in FIG. 2, using a conventional wire electro-discharge machining (EDM) process. First, the manufacturer obtains a billet of conductive material, such as metal, the thickness of which is determined by the application for which the rotary flexure is to be used. The manufacturer machines the billet to the desired outer dimensions (step 100). The manufacturer then may mill the surface of the billet where the flexure blades will be formed to provide relief from the surfaces of objects to be mounted to the lobes (step 102. After milling the surface of the billet, the manufacturer forms a very small hole in the billet, e.g., at the location "X" in FIG. 5 (step 104). The manufacturer then threads a conductive wire through the hole (step 106) and applies tension to the wire (step 108). The manufacturer immerses the billet and the wire in a conducting bath (step 110) and excites the wire (112), which allows the wire to "cut" through the billet. A positioning mechanism, such as a programmable machine, then moves the excited wire through the billet along a predefined path, such as that shown by the arrows in FIG. 5 (step 114). Material lying inside the wire's path falls away from the billet when the wire has completed the path. The wire's first pass through the billet forms one of the flexure lobes and one side each for two of the flexure blades. The manufacturer repeats the process twice to form the other two lobes and to complete the flexure blades (step 116).

The machine that guides the wire through the billet can be programmed to form a relatively large fillet radius at every corner, as shown in FIG. 5. These generous fillet radii, along with the monolithic fabrication process, improve the longevity and reliability of the rotary flexure.

Other embodiments and advantages are within the scope of the following claims. For example, a rotary flexure may include more than three lobe-blade pairs, and the outer wall may be other than ring-shaped. The thickness of the flexure blades may vary within the same rotary flexure to optimize stiffness ratios. The rotary flexure also may be formed with two opposing sets of lobes and blades (a double flexure), which doubles the range of rotary motion but reduces lateral stiffness.

The rotary flexure also may be used in many applications other than that shown here. For example, the flexure may be used in EL gimbal that includes two flexures (one per axis of rotation) or four flexures (two per axis of rotation). The flexure also may be used in applications such as guided missile seeking systems, scan or line cameras, laser "Coordinate Measurement Machines," and telescopes. Finally, the flexure may be produced by techniques other than that shown, including stereo lithography techniques.

What is claimed is:

1. A rotary flexure comprising:
   an outer wall centered on a pivot axis,
   a central element also centered on the pivot axis,
   at least three substantially flexible blade elements each depending from the central element at a proximal end and from the outer wall at a distal end, and
   at least three lobe elements each depending from the central element at a proximal end and extending between the central element and the outer wall, and each being free to rotate about the pivot axis with respect to the outer wall,
   wherein at least three blade elements and at least three lobe elements are constructed as one piece.

2. A rotary flexure comprising:
   an outer wall centered on a pivot axis;
   a central element also centered on the pivot axis;
   at least three blade elements each depending from the central element at a proximal end and from the outer wall at a distal end;
   at least three lobe elements each depending from the central element at a proximal end and extending between the central element and the outer wall, and each being free to rotate about the pivot axis with respect to the outer wall;
   at least three notches, each formed in the distal end of one of the lobe elements; and
   a plurality of detents formed on the outer wall, each detent protruding into one of the notches.

3. The apparatus of claim 1, wherein the blade elements have equal width.

4. The apparatus of claim 1, wherein the blade elements are evenly spaced about the pivot axis.

5. The apparatus of claim 1, wherein one of the lobe elements lies between each pair of blade elements.

6. The apparatus of claim 1, wherein the outer wall, the central element, the blade elements, and the lobe elements all are formed from a single piece of material.

7. The apparatus of claim 1, wherein the blade elements each have an exposed surface that is recessed below an exposed surface of each lobe element.

* * * * *